(12) United States Patent
Leroux

(10) Patent No.: US 8,905,008 B2
(45) Date of Patent: Dec. 9, 2014

(54) GAS SUPPLY MODULE FOR A MOTOR VEHICLE ENGINE, ASSEMBLY OF AN ENGINE CYLINDER HEAD AND SUCH A MODULE, AND MOTOR VEHICLE ENGINE COMPRISING SUCH A MODULE

(75) Inventor: Samuel Leroux, Poissy (FR)

(73) Assignee: Valeo Systems Thermiques, Le Mesnil Saint Denis (FR)

( * ) Notice: Subject to any disclaimer, the term of this patent is extended or adjusted under 35 U.S.C. 154(b) by 36 days.

(21) Appl. No.: 13/511,300

(22) PCT Filed: Nov. 8, 2010

(86) PCT No.: PCT/EP2010/067005
§ 371 (c)(1),
(2), (4) Date: May 22, 2012

(87) PCT Pub. No.: WO2011/064087
PCT Pub. Date: Jun. 3, 2011

(65) Prior Publication Data
US 2012/0247437 A1 Oct. 4, 2012

(30) Foreign Application Priority Data

Nov. 27, 2009 (FR) ...................................... 09 05701

(51) Int. Cl.
*F02B 47/08* (2006.01)
*F02M 25/07* (2006.01)
*F02M 35/10* (2006.01)
*F02B 29/04* (2006.01)

(52) U.S. Cl.
CPC ... *F02M 35/10268* (2013.01); *F02M 35/10255* (2013.01); *Y02T 10/146* (2013.01); *F02B 29/0475* (2013.01); *F02B 29/0418* (2013.01); *F02B 29/0462* (2013.01); *F02M 35/10078* (2013.01)
USPC ...... 123/568.12; 165/125; 165/126; 165/157; 165/158; 165/159; 123/540; 123/568.11; 123/568.17; 123/568.18; 123/568.21; 123/188.14

(58) Field of Classification Search
USPC ............... 123/540, 563, 542, 568.11, 568.12, 123/568.17, 568.18, 568.21, 188.14; 165/125, 126, 157–160
See application file for complete search history.

(56) References Cited

U.S. PATENT DOCUMENTS 4,513,729 A * 4/1985 Udd .............................. 123/563
(Continued)

FOREIGN PATENT DOCUMENTS

DE 10 2007 029036 A1 12/2008
EP 1533512 A2 * 5/2005 ............. F02M 35/10
(Continued)

OTHER PUBLICATIONS

EP 1533512 A2: Electronic translation.*
(Continued)

*Primary Examiner* — Marguerite McMahon
*Assistant Examiner* — Tea Holbrook
(74) *Attorney, Agent, or Firm* — Osha Liang LLP

(57) ABSTRACT

The invention relates to a gas supply module (20) for an engine, comprising a heat exchanger (22) capable of cooling gases for the intake thereof in an intake space of a cylinder head of the engine, and a gas supply valve (24) capable of directing said gases toward the intake space of said cylinder head and/or through said heat exchanger (22), said module (20) further comprising an interface element (26) closing said intake space of said cylinder head. According to the invention, said interface element (26) and said valve (24) are shaped such that said valve (24) can be attached to said cylinder head via at least a first attachment means extending through at least the interface element (26). The invention also relates to an assembly of an engine cylinder head and such a module, and to a motor vehicle engine comprising such an assembly. The invention can particularly be used in the field of motor vehicles.

19 Claims, 3 Drawing Sheets

(56) References Cited

U.S. PATENT DOCUMENTS

Figure 1:
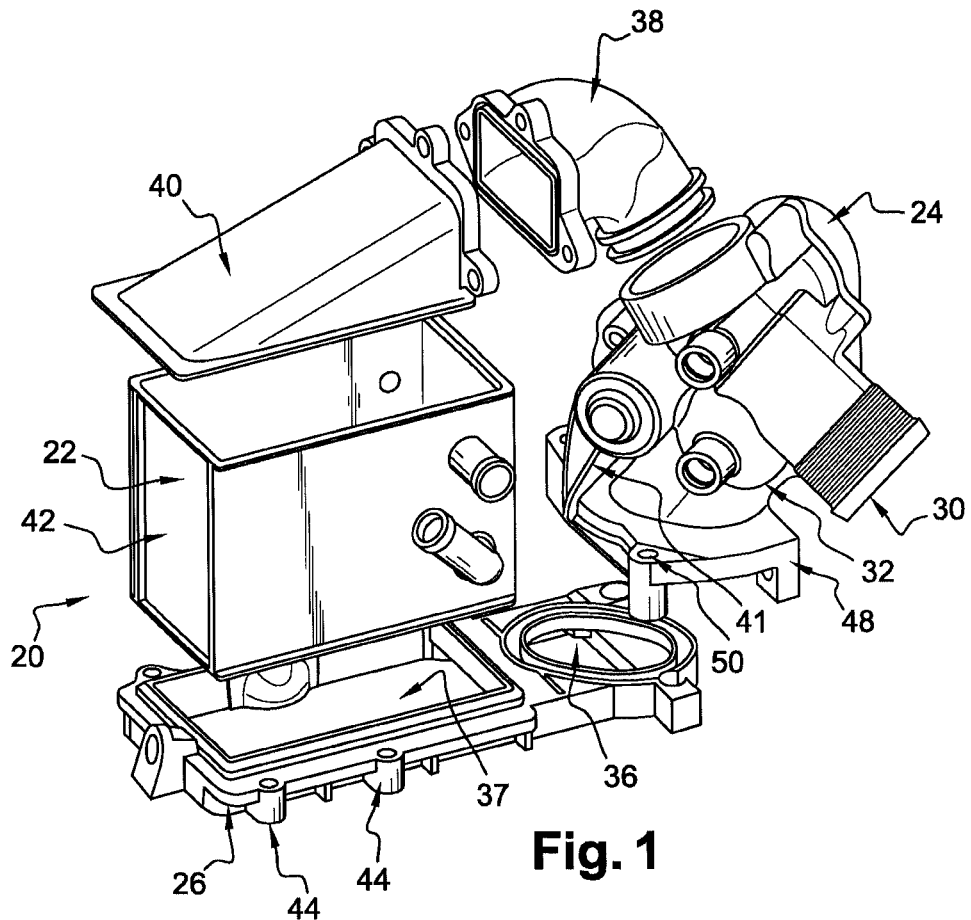

| | | | |
|---|---|---|---|
| 5,337,724 A * | 8/1994 | Arakawa et al. | 123/563 |
| 5,685,519 A * | 11/1997 | Bircann et al. | 251/129.15 |
| 5,690,082 A * | 11/1997 | Tanioka et al. | 123/568.12 |
| 5,931,131 A * | 8/1999 | Hackett | 123/90.38 |
| 5,954,021 A * | 9/1999 | Yuunaga | 123/184.42 |
| 6,237,547 B1 * | 5/2001 | Ishiyama | 123/41.31 |
| 7,077,113 B2 * | 7/2006 | Bilek et al. | 123/563 |
| 2004/0079348 A1 * | 4/2004 | Mori et al. | 123/568.17 |
| 2006/0157036 A1 * | 7/2006 | Andersen | 123/563 |
| 2006/0283429 A1 * | 12/2006 | Kuhnel et al. | 123/568.18 |
| 2007/0017489 A1 * | 1/2007 | Kuroki et al. | 123/568.12 |
| 2008/0184974 A1 * | 8/2008 | Kobayashi et al. | 123/568.12 |
| 2008/0257317 A1 * | 10/2008 | Cerabone et al. | 123/568.12 |
| 2008/0289804 A1 * | 11/2008 | Baumann et al. | 165/157 |
| 2009/0139502 A1 * | 6/2009 | Klipfel et al. | 123/568.12 |

FOREIGN PATENT DOCUMENTS

| | | |
|---|---|---|
| FR | 2 908 833 A1 | 5/2008 |
| FR | 2 931 517 A1 | 11/2009 |
| WO | 2009/141711 A1 | 11/2009 |

OTHER PUBLICATIONS

International Search Report w/translation from PCT/EP2010/067005 dated Dec. 17, 2010 (6 pages).

* cited by examiner

GAS SUPPLY MODULE FOR A MOTOR VEHICLE ENGINE, ASSEMBLY OF AN ENGINE CYLINDER HEAD AND SUCH A MODULE, AND MOTOR VEHICLE ENGINE COMPRISING SUCH A MODULE

The invention relates to a gas supply module for a motor vehicle engine, an assembly of an engine cylinder head and such a module, and a motor vehicle engine comprising such an assembly.

The invention relates more particularly to a gas supply module for an engine comprising a heat exchanger capable of cooling gases for the intake thereof into an inlet volume of a cylinder head of the engine and a gas supply valve capable of directing the gases toward the inlet volume of the cylinder head and/or through the heat exchanger and an interface element closing the volume of the cylinder head.

An internal combustion engine of a motor vehicle comprises a combustion chamber, generally formed by a plurality of cylinders, in which a mixture of combustion agent and fuel is burned in order to generate the work of the engine. The combustion agent comprises air which may be compressed or not according to whether the engine comprises a turbocharger or not. The air may also be mixed with the exhaust gases: known as the recirculated exhaust gases. The gases admitted into the combustion chamber are denoted inlet gases.

It is known that the inlet gases are received in the region of a device often denoted by the person skilled in the art as the "intake manifold". The intake manifold is fixed to the cylinder head of the engine, in the region of the inlet of the cylinders. Depending on the engine speed, the inlet gases may be cooled, entirely or partially, or not at all. As a result, it is known to provide two pipes supplying the manifold: one directly conveying the inlet gases into the manifold, the other indirectly conveying the inlet gases via a heat exchanger, which makes it possible to cool the gases passing through said heat exchanger or in some cases to heat said gases.

Also known is a gas supply module for a motor vehicle engine mounted on an engine comprising a heat exchanger housed in a casing incorporating the inlet and outlet manifolds for the inlet gases (also called intake gases), the outlet manifold forming an interface element closing the inlet volume of the cylinder head of the engine. In this prior art, it is provided that one of the manifolds of the heat exchanger supports a valve.

The valve support causes stresses in the region of the manifold. Said stresses are associated with vibrations and strain caused by the weight of the valve to which may be added, moreover, stresses associated with the circulation of the compressed inlet gases passing through the manifold of the heat exchanger.

It is thus necessary to provide means for strengthening the manifold so that said manifold does not deteriorate due to the vibrations or pressure of the inlet gases. Said strengthening means do not enable a compact design to be proposed for the gas supply module of the engine.

The object of the invention is to propose a gas supply module for an engine, which is compact whilst having good resistance to the stresses due to the support of the valve.

To this end, the invention proposes a gas supply module for an engine as disclosed above in which the interface element and the valve are configured in order to permit the fixing of the valve to the cylinder head via at least one first means for fixing passing through at least the interface element.

Such a module makes it possible to eliminate the majority of stresses associated with the support of the valve in the region of the cylinder head of the engine. Such a configuration results in a gas inlet module which is more compact than that proposed by the prior art, whilst reinforcing its strength.

Particular embodiments of the invention propose that:
- the interface element is produced in the form of an interface plate, the interface plate comprising at least one through-passage and the valve comprising a flange provided with at least one fixing orifice, and the through-passage being aligned with the fixing orifice so as to form a passage for said first means for fixing,
- the flange is provided opposite the interface plate so that said flange and plate extend in parallel planes,
- the interface element is produced in the form of an interface plate, the interface plate comprising at least one recess forming a through-passage and the valve comprising at least one protrusion provided with a fixing orifice and the protrusion of the valve is introduced into the recess and the fixing orifice receives the first means for fixing to the cylinder head,
- the first means for fixing is a screw,
- the valve comprises reinforcing ribs, said reinforcing ribs being arranged in the vicinity of a zone of the module comprising the first means for fixing,
- the heat exchanger comprises a casing attached to the interface element,
- the interface element comprises a periphery and has at least one protrusion arranged in the region of the periphery, the protrusion being capable of receiving a second means for fixing, capable of fixing the interface element to the cylinder head,
- the valve is a double valve comprising an inlet duct, a direct outlet duct fixed to the interface element opposite a cavity permitting the direct outlet duct to open into the inlet volume of the cylinder head and an indirect outlet duct opening into an intake manifold of the heat exchanger, and
- the interface element comprises an orifice, known as the outlet of the heat exchanger, the outlet orifice of the exchanger being placed opposite the heat exchanger and being capable of permitting communication between the gases passing through the heat exchanger and the inlet volume of the cylinder head.

The invention also relates to an assembly of a cylinder head of a motor vehicle engine and a module as disclosed above in which the cylinder head comprises orifices capable of cooperating with the first and second means for fixing in order to fix the module to the cylinder head.

The invention also relates to an internal combustion engine of a motor vehicle, comprising a combustion chamber and an assembly of a cylinder head and a gas supply module for an engine as disclosed above.

Figure 2:
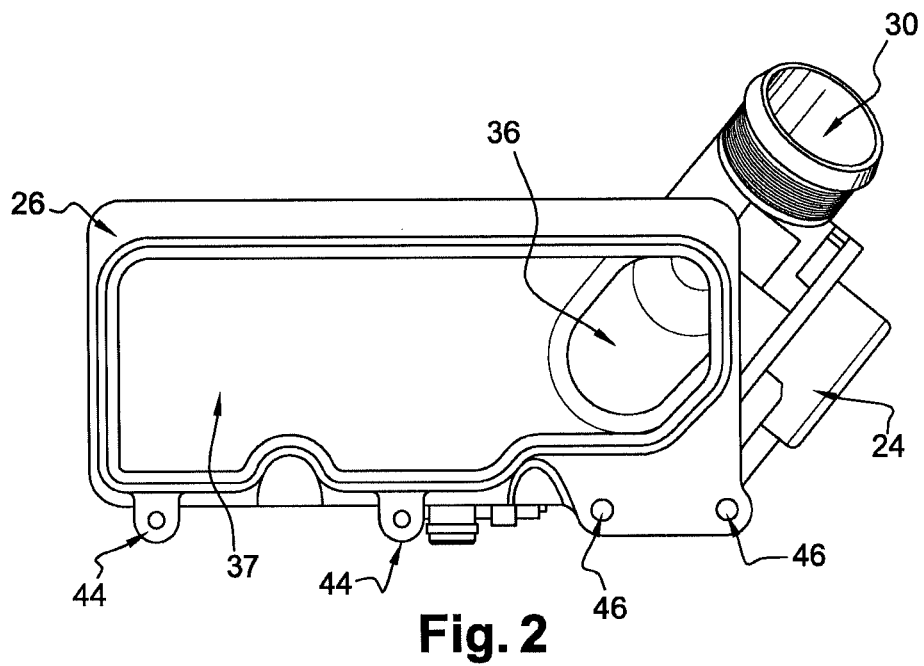
Figure 3:
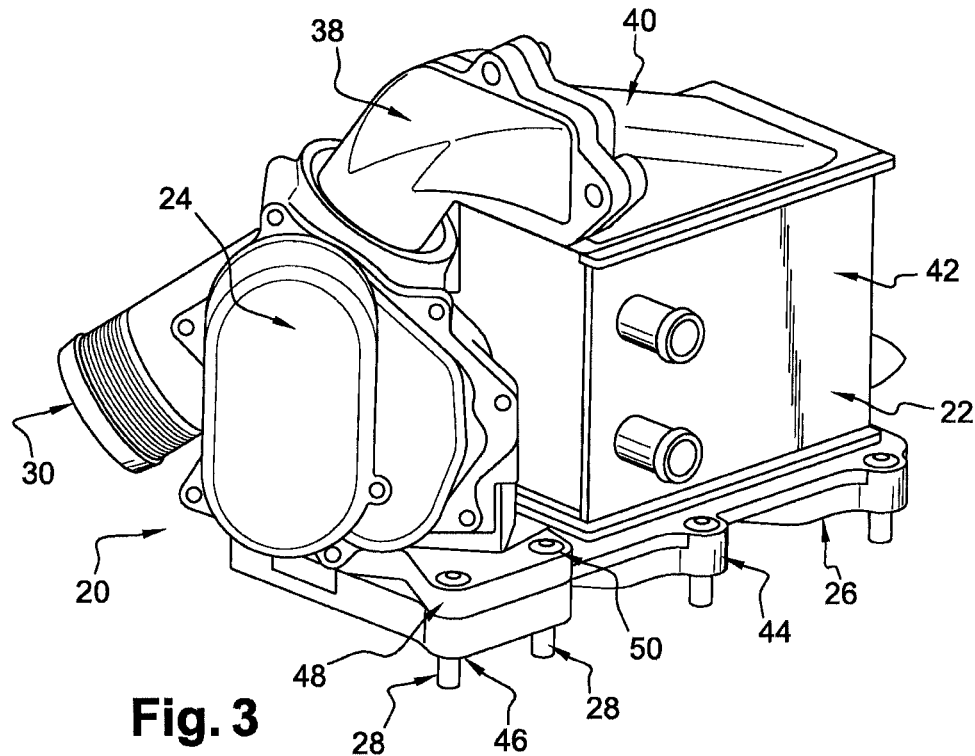
Figure 4:
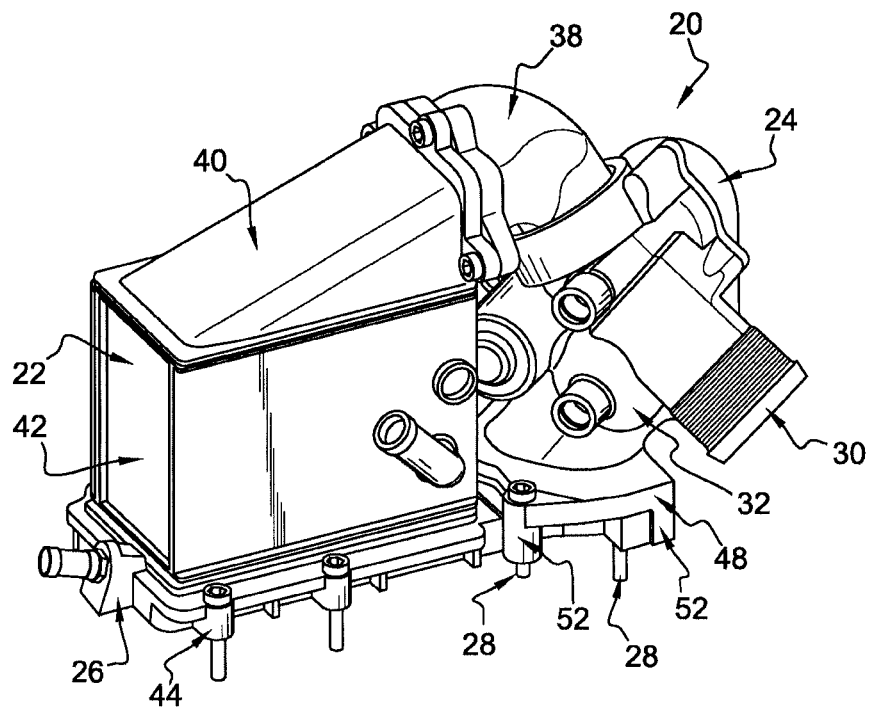
Figure 5:
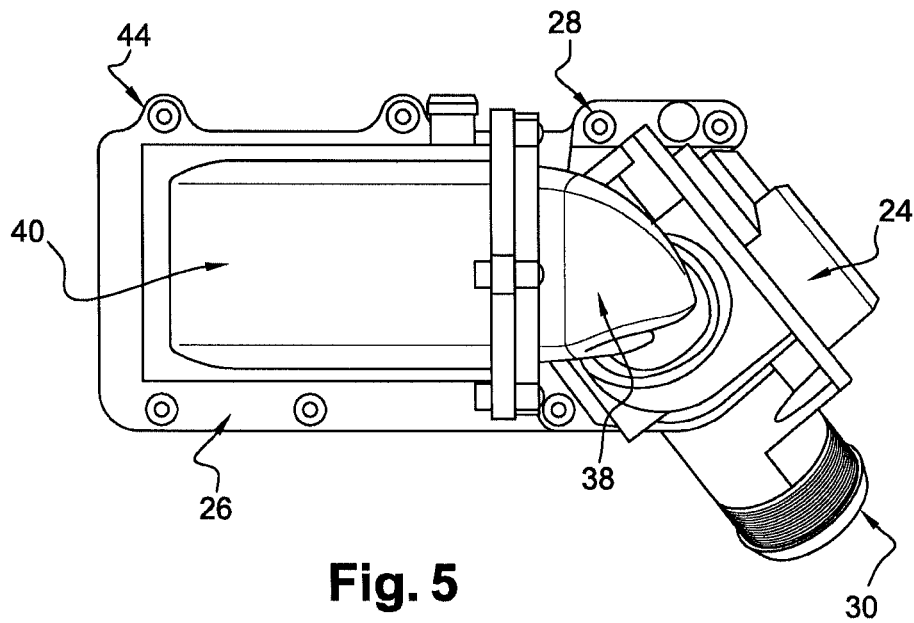
Figure 6:
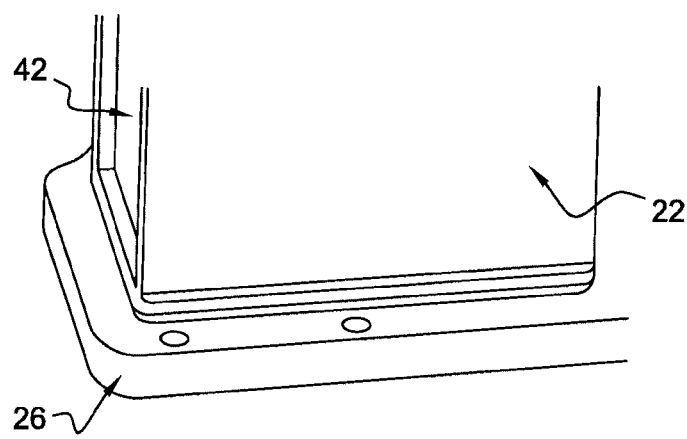

The invention will be understood more clearly with reference to the following description of the preferred embodiment of the device and of the engine of the invention, with reference to the accompanying drawings, in which:

FIG. 1 shows an exploded perspective view of a gas supply module according to an embodiment of the invention, FIG. 2 shows a view from below of a gas supply module according to a first embodiment of the invention, FIG. 3 shows a perspective view of a gas supply module according to the first embodiment of the invention, FIG. 4 shows a perspective view of a gas supply module according to a second embodiment of the invention, FIG. 5 shows a view from above of a gas supply module according to the second embodiment of the invention, and FIG. 6 shows an embodiment of the connection between a heat exchanger and an interface element in a gas supply module according to the invention.

The invention relates to a gas supply module 20 for an engine. The module comprises a heat exchanger 22 capable of cooling gases for the intake thereof into an inlet volume of a cylinder head (not shown) of the engine, a gas supply valve 24 capable of directing the gases toward the inlet volume of the cylinder head and/or through the heat exchanger 22 and an interface element 26 closing the inlet volume of the cylinder head.

The heat exchanger 22 comprises, in the embodiments, a casing 42 attached, for example by soldering or welding, to the interface element 26.

In the embodiment illustrated in FIG. 6, the casing 42 is formed by four metal plates, for example made of aluminum, assembled together, for example by soldering.

The plates of the casing 42 form an envelope comprising four so-called solid faces and two so-called free faces. The free faces of the casing 42 are located opposite one another.

A heat exchanger bundle (not shown) is inserted into the casing 42. Said bundle could, for example be produced in the form of a stack of plates, not shown, creating a passage for the inlet gases and a passage for a heat transfer fluid.

In this case, an intake manifold (also called the manifold box) 40 for the inlet gases is fixed to one of the free faces of the casing 42 whilst the interface element 26 is fixed to the other free face.

The valve 24, in turn, may, for example, be a double valve comprising an inlet duct 30, a direct outlet duct fixed to the interface element 26 and an indirect outlet duct 38 opening into the intake manifold 40 of the heat exchanger 22. The direct outlet duct 32 is fixed to the interface element 26 opposite a cavity 36 of the interface element 26 permitting the direct outlet duct 32 to open into the inlet volume of the cylinder head.

In the embodiment illustrated in FIG. 1, the indirect outlet duct 38 is produced in the form of an element which, once the module 20 is assembled, is attached to the body of the valve 24, and to the manifold box 40. The direct outlet duct 32 is, in turn, in this case produced from the same material as the body of the valve 24.

Thus, the inlet gases of the engine penetrating the inlet duct 30 of the valve 24 may be either directly introduced into the cylinder head of the engine via the direct outlet duct 32, or indirectly introduced into the cylinder head of the engine, via the indirect outlet duct 38 which requires passing through the heat exchanger 22.

The indirect 38 and direct 32 outlet ducts may have in the region of their end connected, respectively, to the manifold box 40 and the interface plate 26 a fixing flange to attach said outlet ducts 38 and 32, respectively, to the intake manifold 40 and to an interface plate 26.

In the case of a double valve, said valve is arranged so that the inlet gases may be distributed entirely or partially in one and/or the other of the outlet ducts and 38; thus it is possible to regulate the proportion of inlet gas which is subjected to thermal treatment, for example cooling, and that which is not subjected to thermal treatment.

In one particular embodiment, the valve 24 could comprise reinforcing ribs 41. Said reinforcing ribs 41 could, for example, be arranged in the vicinity of a zone of the module comprising a first means for fixing (disclosed below).

In the embodiment illustrated in FIG. 1, the reinforcing ribs 41 are positioned in the region of the direct outlet duct 32. More particularly, in this case the reinforcing ribs 41 extend in the vicinity of half of the direct outlet duct 32 as far as the fixing flange of the direct outlet duct 32 to the interface plate 26.

The interface element 26 is in this case intended to be in immediate/direct contact with the cylinder head of the engine. In other words, the interface element 26 is directly mounted on the cylinder head of the engine.

In one particular embodiment of the invention, the heat exchanger may be attached to the interface element 26.

In the embodiments illustrated in FIGS. 1 to 6, the interface element 26 closing the volume of the cylinder head defines a passage for the gases emerging from the valve without passing via the heat exchanger and/or for the gases emerging from the heat exchanger.

In the examples illustrated here, the interface element 26 is produced in the form of an interface plate 26. A non-illustrated embodiment proposes that the interface element 26 is a manifold, preferably the outlet manifold (also called the manifold box), of the heat exchanger 22.

According to the invention, the interface element 26 and the valve 24 are configured to permit a fixing of the valve 24 to the cylinder head via at least one first means for fixing 28 passing through at least the interface element 26.

In the embodiments illustrated here, the first means is a screw.

In other words, the valve 24 is in contact with the interface element 26 (in this case the plate 26) but without being fixed there. The valve 24 is fixed to the cylinder head of the engine. The first means for fixing permits, in one particular embodiment of the invention, the assembly of the interface element 26 valve 24 to be held in position.

The interface element 26 (in this case the interface plate 26) has a periphery and has at least one protrusion 44 arranged in the region of the periphery. The protrusion 44 is capable of receiving a second means for fixing, in this case also a screw, capable of fixing the interface element 26 to the cylinder head.

One embodiment proposes that the protrusions 44 are at least placed opposite the heat exchanger 22 and more particularly its casing 42.

Moreover, the interface element 26 comprises an orifice 37, known as the outlet orifice of the heat exchanger, placed opposite the heat exchanger (and more particularly opposite its casing 42). The outlet orifice of the heat exchanger is capable of permitting communication between the gases passing through the heat exchanger 22 and the inlet volume of the cylinder head.

In this embodiment, the outlet orifice 37 of the heat exchanger 22 and the cavity 36 permitting the direct outlet duct 32 to open into the inlet volume of the cylinder head are placed at a distance from one another. In other words, said two openings 26 and 37 of the interface element 26 are separate from one another.

According to a first embodiment illustrated in particular in FIGS. 2 and 3, the interface element 26 is produced in the form of an interface plate 26 as already disclosed above.

In this example, the interface plate 26 comprises at least one through-passage 46. The valve 24 comprises, in turn, a flange 48, known as the distal flange, provided with at least one fixing orifice 50. The distal flange 48 is placed at the distal end of the inlet of the valve 24 and permits the fixing of the direct outlet duct 32 to the interface plate 26.

In this case, the through-passage 46 of the interface plate 26 is aligned with the fixing orifice 50 of the direct outlet duct 32 so as to form a passage for the first means for fixing 28. In other words, the through-passage 46 and the fixing orifice 50 are placed opposite one another to form a duct opening on both sides of the interface plate 26 and the distal flange (and thus of the direct outlet duct 32), said duct receiving the first means for fixing 28.

In this embodiment, the distal flange 48 is provided opposite the interface plate 26 so that said flange and plate extend in parallel planes. In other words, in this case, the distal flange 48 is superimposed on the interface plate 26.

A second embodiment illustrated in FIGS. 4 and 5 also proposes in this case that the interface element 26 is produced in the form of an interface plate 26.

In this embodiment, the interface plate 26 comprises at least one recess forming a through-passage. The valve comprises, in turn, at least one protrusion (or post) 52 provided with a fixing orifice.

The protrusion 52 of the valve 24 is introduced into the recess/through-passage of the interface plate 26. In this embodiment, the fixing orifice receives the first means for fixing 28 to the cylinder head. One particular embodiment proposes that the protrusion 52 of the valve 24 and the recess of the interface plate 26 are of complementary shape.

In other words, in this embodiment, at least one part of the interface plate 26 encloses the protrusion 52 and, as a result, the first means for fixing 28. Also, in other words, the means for fixing 28 is surrounded by the fixing orifice of the valve 24 and at least partially by the interface plate 26.

The invention also relates to an assembly of a cylinder head of a motor vehicle engine of a module 20 as disclosed above in which said cylinder head comprises orifices capable of cooperating with the first 28 and second means for fixing in order to fix the module 20 to the cylinder head.

In such a case, it is possible to envisage, for example, machining or tapping the orifices of the cylinder head of the engine.

The invention also relates to an internal combustion engine of a motor vehicle, comprising a combustion chamber and a cylinder head and a gas supply module for an engine as disclosed above.

The invention is not limited to the embodiments disclosed above which are given solely by way of example, but it also encompasses all variants which the person skilled in the art might envisage within the scope of the following claims. The variants disclosed above may be used separately or in combination with one another.

The invention claimed is:

1. A gas supply module for an engine, comprising:
   a heat exchanger capable of cooling gases for the intake thereof into an inlet volume of a cylinder head of the engine;
   a gas supply valve capable of directing said gases toward the inlet volume of said cylinder head and/or through said heat exchanger; and
   an interface element closing said inlet volume of said cylinder head,
   wherein said interface element and said gas supply valve are configured to permit fixing of said gas supply valve to said cylinder head via at least one first element for fixing passing through at least the interface element, and
   wherein said interface element is produced in the form of an interface plate, said interface plate comprising at least one recess forming a through-passage, and said gas supply valve comprises at least one protrusion provided with a fixing orifice, said protrusion being introduced into the at least one recess, and wherein said fixing orifice receives said first element for fixing to the cylinder head.

2. The module as claimed in claim 1, wherein said interface element is produced in the form of an interface plate, said interface plate comprising at least one through-passage, and said gas supply valve comprises a flange provided with at least one fixing orifice and said through-passage being aligned with said fixing orifice to form a passage for said first element for fixing.

3. The module as claimed in claim 2, wherein said flange is provided opposite said interface plate so that said flange and plate extend in parallel planes.

4. The module as claimed in claim 1, wherein the first element is a screw.

5. The module as claimed in claim 1, wherein said gas supply valve comprises reinforcing ribs, said reinforcing ribs being arranged in a vicinity of a zone of the module comprising the first element.

6. The module as claimed in claim 1, wherein said heat exchanger comprises a casing attached to said interface element.

7. The module as claimed in claim 1, wherein said interface element comprises a periphery and has at least one protrusion arranged in a region of said periphery, said protrusion being capable of receiving a second element for fixing said interface element to said cylinder head.

8. The module as claimed in claim 1, wherein the valve is a double valve comprising an inlet duct, a direct outlet duct fixed to the interface element opposite a cavity permitting said direct outlet duct to open into the inlet volume of the cylinder head and an indirect outlet duct opening into an intake manifold of said heat exchanger.

9. The module as claimed in claim 1, wherein said interface element comprises an outlet orifice of the heat exchanger, said outlet orifice of the heat exchanger being placed opposite the heat exchanger and being capable of permitting communication between the gases passing through said heat exchanger and said inlet volume of said cylinder head.

10. An assembly of a cylinder head of a motor vehicle engine and a module as claimed in claim 1, in which said cylinder head comprises orifices capable of cooperating with the first and second elements for fixing in order to fix said module to said cylinder head.

11. An internal combustion engine of a motor vehicle, comprising a combustion chamber and an assembly of a cylinder head and a gas supply module for an engine as claimed in claim 10.

12. The module as claimed in claim 1, wherein said interface element comprises at least one recess forming a through-passage, wherein said gas supply valve comprises at least one protrusion provided with a fixing orifice, and wherein said protrusion is introduced into the at least one recess.

13. The module as claimed in claim 1, wherein said valve comprises a distal flange provided with at least one fixing orifice.

14. The module as claimed in claim 13, wherein the distal flange is placed at a distal end of an inlet of the valve and permits an engagement of a direct outlet duct to the interface element.

15. The module as claimed in claim 13, wherein the distal flange is provided opposite the interface element.

16. The module as claimed in claim 1, wherein said interface element comprises at least one recess, wherein said gas supply valve comprises at least one protrusion, and wherein the at least one recess of the interface element and the at least one protrusion of the gas supply valve are complementary in shape.

17. A gas supply module for an engine, comprising:
   a heat exchanger capable of cooling gases for the intake thereof into an inlet volume of a cylinder head of the engine;

a gas supply valve capable of directing the gases toward the inlet volume of the cylinder head and/or through said heat exchanger;

an interface element closing the inlet volume of the cylinder head, wherein said interface element and said gas supply valve are configured to permit fixing of said gas supply valve to said cylinder head without fixing the gas supply valve to said interface element.

18. A gas supply module for an engine, comprising:

a heat exchanger capable of cooling gases for the intake thereof into an inlet volume of a cylinder head of the engine;

a gas supply valve capable of directing said gases toward the inlet volume of said cylinder head and/or through said heat exchanger; and an interface element closing said inlet volume of said cylinder head, wherein said interface element and said gas supply valve are configured to permit fixing of said gas supply valve to said cylinder head via at least one first element for fixing passing through at least the interface element, and wherein said interface element comprises at least one recess forming a through-passage, wherein said gas supply valve comprises at least one protrusion provided with a fixing orifice, and wherein said protrusion is introduced into the at least one recess.

19. A gas supply module for an engine, comprising:

a heat exchanger capable of cooling gases for the intake thereof into an inlet volume of a cylinder head of the engine;

a gas supply valve capable of directing said gases toward the inlet volume of said cylinder head and/or through said heat exchanger; and an interface element closing said inlet volume of said cylinder head, wherein said interface element and said gas supply valve are configured to permit fixing of said gas supply valve to said cylinder head via at least one first element for fixing passing through at least the interface element, and wherein said interface element comprises at least one recess, wherein said gas supply valve comprises at least one protrusion, and wherein the at least one recess of the interface element and the at least one protrusion of the gas supply valve are complementary in shape.

* * * * *